No. 895,224. PATENTED AUG. 4, 1908.
E. AMODEO-SALVATOR.
MEANS FOR INDICATING AND RECORDING THE REVOLUTIONS
OF MARINE ENGINES.
APPLICATION FILED FEB. 7, 1907. RENEWED OCT. 21, 1907.
6 SHEETS—SHEET 1.
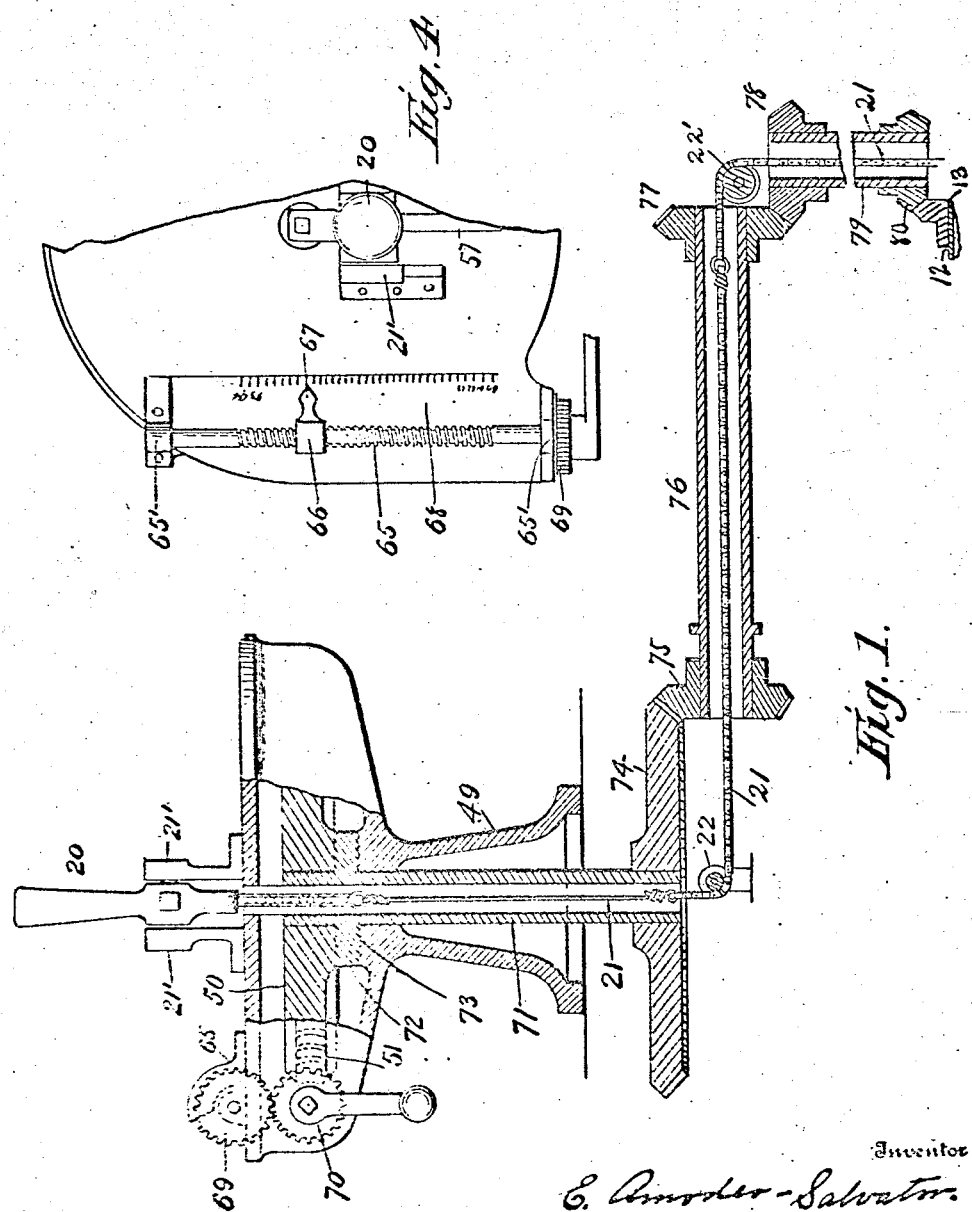

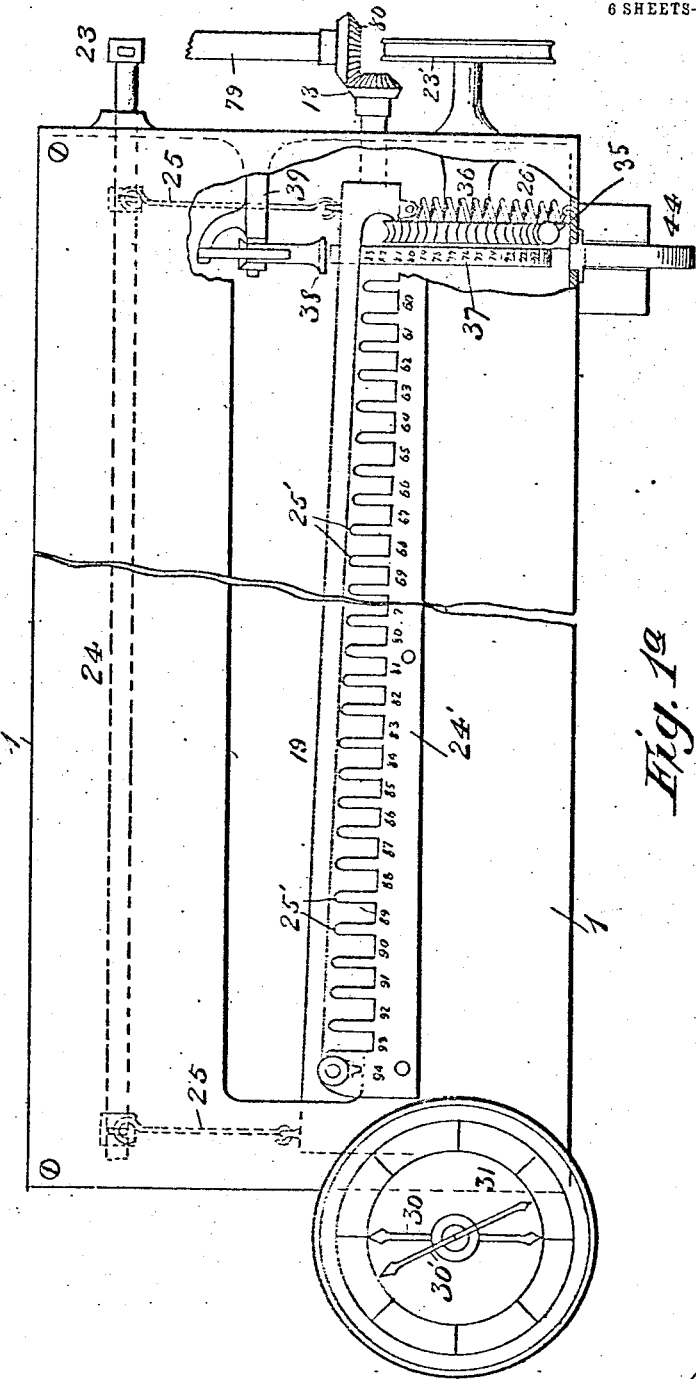

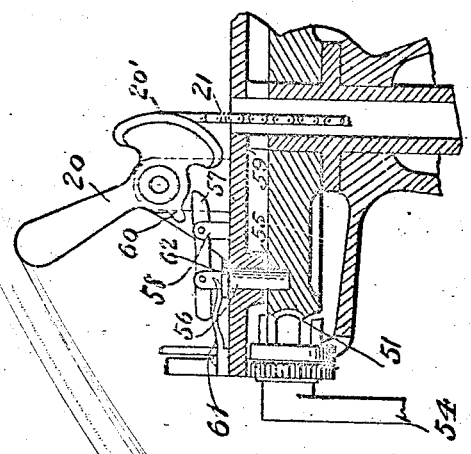

No. 895,224. PATENTED AUG. 4, 1908.
E. AMODEO-SALVATOR.
MEANS FOR INDICATING AND RECORDING THE REVOLUTIONS
OF MARINE ENGINES.
APPLICATION FILED FEB. 7, 1907. RENEWED OCT. 21, 1907.

6 SHEETS—SHEET 5.

No. 895,224. PATENTED AUG. 4, 1908.
E. AMODEO-SALVATOR.
MEANS FOR INDICATING AND RECORDING THE REVOLUTIONS
OF MARINE ENGINES.
APPLICATION FILED FEB. 7, 1907. RENEWED OCT. 21, 1907.
6 SHEETS—SHEET 6.

Witnesses
Inventor
E. Amodeo-Salvator.
By D. C. Reinohl
Attorney

UNITED STATES PATENT OFFICE.

EMMANUEL AMODEO-SALVATOR, OF BROOKLYN, NEW YORK.

MEANS FOR INDICATING AND RECORDING THE REVOLUTIONS OF MARINE ENGINES.

No. 895,224.  Specification of Letters Patent.  Patented Aug. 4, 1908.

Application filed February 7, 1907, Serial No. 356,191. Renewed October 21, 1907. Serial No. 398,505.

*To all whom it may concern:*

Be it known that I, EMMANUEL AMODEO-SALVATOR, a citizen of the United States, residing at Brooklyn, in the county of Kings and State of New York, have invented certain new and useful Improvements in Means for Indicating and Recording the Revolutions of Marine Engines; and I do hereby declare the following to be a full, clear, and exact description of the invention, such as will enable others skilled in the art to which it appertains to make and use the same.

My invention relates primarily to means for maintaining a predetermined speed of war vessels, such as battle-ships, cruisers and the like in maneuvers or target practice, to prevent the ships losing their proper position in the line and prevent collision.

The invention consists in devices for the purpose as will be fully disclosed in the following specification and claims.

Figure 5:
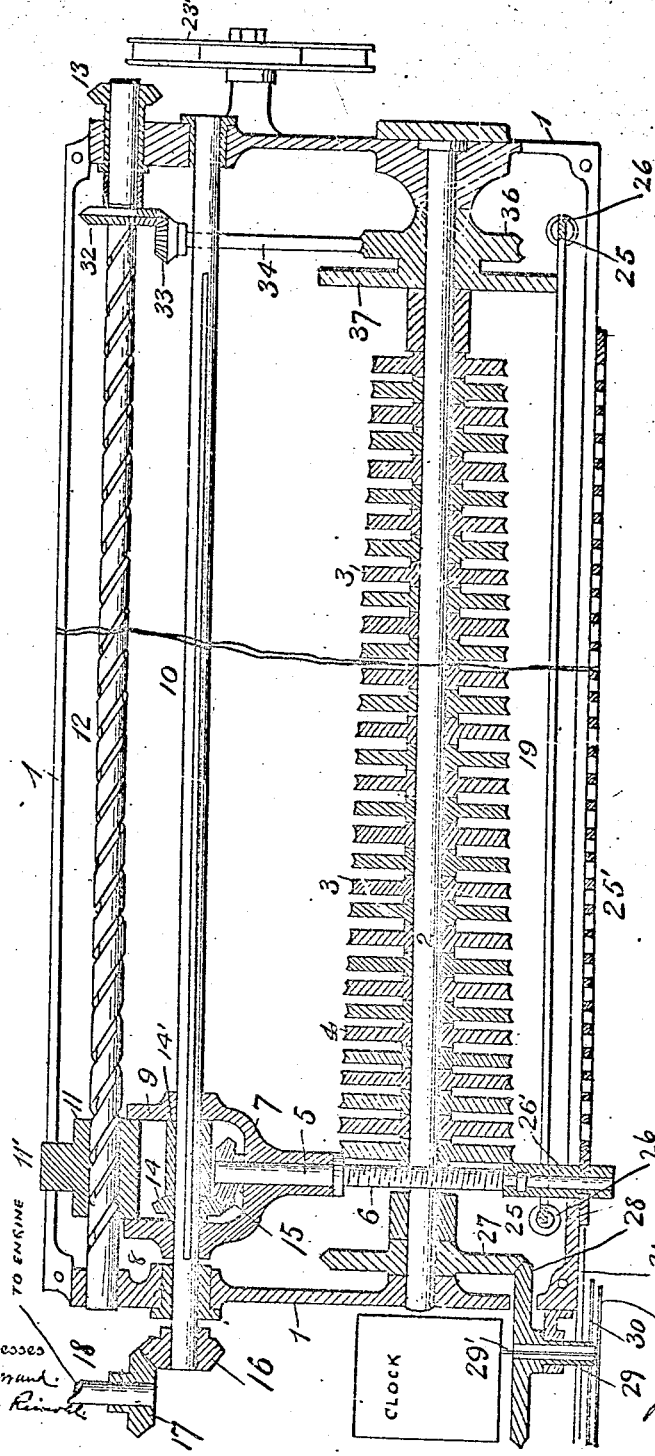
Figure 7:
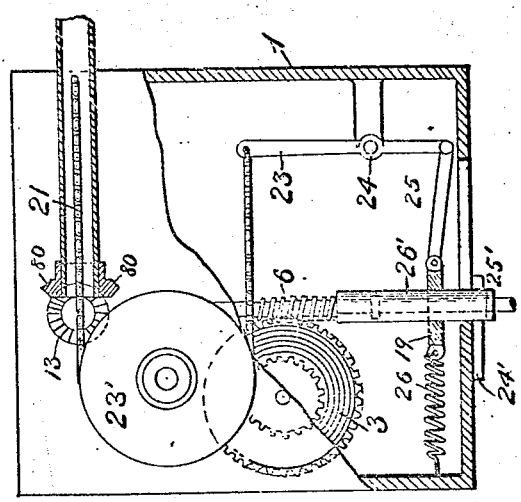
Figure 6:
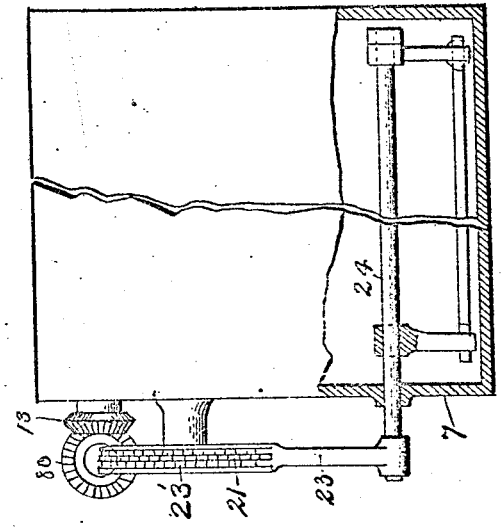
Figure 8:
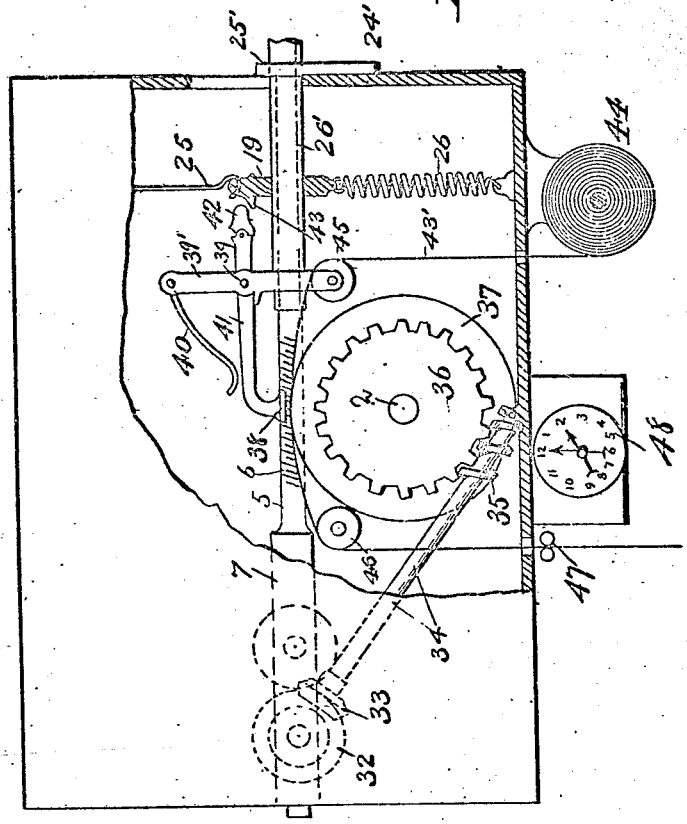

In the accompanying drawings, which form part of this specification:—Figure 1 represents a side elevation partly in section of mechanism embodying my invention. Fig. 1ᵃ a side elevation of the revolution indicator with part of the case broken away. Fig. 2 a top plan view, partly broken away, of means for operating the revolution indicator, the indicator being removed. Fig. 3 a vertical transverse section on line 3, 3, Fig. 2, partly in elevation. Fig. 4 a top plan view of the revolution indicator. Fig. 5 a horizontal section of the revolution indicator. Fig. 6 a top plan view showing the means for engaging and disengaging the worm gear. Fig. 7 an end view showing the same mechanism, and Fig. 8 an end view of the revolution indicator partly in section showing the recording mechanism.

Reference being had to the drawings and the designating characters thereon, the numeral 1 indicates the case of the engine revolution indicator. 2 a shaft supported in and extending through the case and has secured thereon a series of disks 3 graduated in diameter and provided with peripheral worm teeth 4, which vary from 94 teeth on the largest disk, to 60 teeth on the smallest disk shown, the number of teeth on each disk corresponding with the revolutions of the engine per minute; that is to say, when the largest disk is connected, the engine is running at 94 revolutions per minute, and when the smallest disk is connected the engine is running at 60 revolutions per minute.

5 indicates a revoluble shaft provided with worm teeth 6, which engage the several disks 3, is supported in a yoke 7 having arms 8, 9, which engage a shaft 10, and between the arms 8, 9, is a nut 11, engaged by a screw threaded shaft 12 having a bevel gear 13 on one end thereof for moving the shaft 5 from engagement with one disk to another throughout the series of disks 3. The nut 11 is provided with a lug 11′ which extends through the wall of the case 1, to prevent the nut turning on the shaft 12.

On the shaft 10, is a bevel gear 14, held in position by a sleeve 14′ between the gear and the arm 9, which gear engages a like gear 15 on the shaft 5 to revolve said shaft and the disks 3.

16 is a bevel gear on the end of shaft 10 which engages a bevel gear 17 on a shaft 18 which is connected by intermediate shafts with the main shaft of the engine (not shown) to take its speed therefrom.

The shaft 5 and its yoke 7 swing vertically on the shaft 10 to engage and disengage the worm gear, and the free end of the shaft 5 engages a slotted yoke 19 the length of the space occupied by the disks 3, is raised by the lever 20, the chain 21 passing over sheaves 22, 22′ and 23′ and is connected to lever 23 on shaft 24, and the shaft 24 is connected to the yoke 19, by links 25, 25. After the shaft 5 has been shifted to the desired disk 3, the shaft 5 is brought into operative engagement with the disk by springs 26, 26, and the shaft 5 is locked in engagement with the disks 3 by a rack 24′ having projecting fingers 25′ between which the sleeve 26′ on the shaft 5 lies. The spaces between the fingers 25′ are numbered, as shown in Fig. 1ᵃ, to correspond with the disk 3 with which the shaft 5 is in engagement. The rack 24′ being outside of the casing 1, and the shaft 5 extending through the casing and the rack 24′, the engineer can readily see the position of the shaft 5 and by the numerals under the spaces between the fingers, he is apprised of the number of revolutions of the engine that are required by the officer on deck or on the bridge.

On the shaft 2, carrying the disks 3 is a bevel gear 27, which engages a like bevel gear 28 provided with a hollow shaft 29 on which is a hand 30, and through the shaft 29 projects a shaft 29′ from a clock, (not shown) bearing the second hand 30′ of the clock, and both hands revolve over a dial 31 which may be separated into spaces representing seconds. The graduated scale on the dial may however be dispensed with, as the engineer has only to watch the two hands to see that they revolve in unison, one over the other, which indicates to him that the engine is making the required number of revolutions or speed demanded by the officer on the bridge and to which he has set the revolution indicator.

On the shaft 12 is a bevel gear 32 which engages a bevel gear 33 on a shaft 34 provided with a worm gear 35 of 3/8 of an inch pitch, to engage a worm gear wheel 36 having 20 teeth on its perimeter, and integral with said wheel 36, or connected thereto is a recording wheel 37, having numbers on its periphery, in this instance running from 60 to 94, to correspond with the graduation of the disks 3.

38 is a hammer pivoted on a post 39 and having a spring 40 on the upper end of the bar 39' which engages the arm 41 of the hammer and forcibly drives it down, and on the opposite end of the arm 41, is a pivoted latch 42, which is engaged by a toe or projection 43 on the yoke 19, and as the yoke rises the upward swing of the latch 42 allows the toe to pass it, but as the yoke descends, the toe strikes the latch and raises the hammer 38 which is instantly forced down by the spring 40 and records the number on the wheel 37 on a strip of paper 43' graduated into hours, minutes and seconds, not shown. The paper is supplied from a roll 44, passes over rollers 45, 46, on top of the wheel 37 and under the hammer 38, and is drawn by a friction roll 47 operated by a clock 48, in the usual manner.

49 indicates a case or stand designed to rest on the bridge, the position of the commanding officer, while maneuvering, in target practice or in actual engagement. Within the case is a horizontal disk 50 having a worm gear 51 on its periphery, and is rotated by a shaft 52 having a worm gear 53 thereon which engages the gear 51, through the medium of a crank 54, and is operated by the commanding officer. In the upper surface of the disk are a series of holes 55, thirty-five in number corresponding with the number of disks 3 in the revolution indicator, 56 is a pin to engage said holes 55, to lock the disk 50 in any predetermined position. The pin 56 is connected to a lever 57 pivotally supported on a post 58 on the cover 59 of the casing and is engaged by a lug 60 on the lever 20, to raise the pin 56 out of engagement with the holes, and the pin is returned or seated in the proper hole by a spring 61 engaging a collar 62 on the pin. The disk 50 is limited in its revolution either to the right or the left by a projection 63 on the upper side of the disk which engages a shoulder or stop 64, one on each side of the transverse center of the casing, to prevent the disk being moved too far to register with the locking pin 56.

The rotation of the disk 50 is indicated by a screw-threaded shaft 65 supported in bearings 65' on which a nut 66 is provided with an index finger 67 which registers with a graduated scale 68, extending from 60 to 94 to correspond with the graduated disks 3 of the engine revolution indicator. The shaft 65 is provided with a gear wheel 69, which engages a gear wheel 70 on the shaft 52 and is rotated thereby as the shaft 52 is rotated to change the position of the disk 50, and the shaft 5 to engage the disks 3. The lever 20 is provided with a sector-shaped face 20' over which the chain 21 works and is supported in bearings 21' on the top of the case 49.

71 is a hollow shaft to which the disk 50 is secured and is revolved thereby, the shaft having a collar 72 which rests on a seat 73 in the case 49, and on the lower end of the shaft is a bevel gear wheel 74 which engages a like bevel gear wheel 75 on one end of a hollow shaft 76, while a like bevel gear wheel 77 at the opposite end of the shaft 76 engages a bevel gear 78 on one end of a hollow shaft 79 having a bevel gear 80, which engages the gear 13 on shaft 12.

The ship being under the control of the officer on the bridge, and he desiring to change the speed of the ship, he seizes the lever 20, with his right hand, draws it toward him, which through the medium of the chain 21 and the yoke 19, disengages the shaft 5 from its disk 3, and simultaneously raises the pin 56 out of engagement with the disk 50, when with his left hand he turns the crank 54 and revolves shaft 52 one revolution to increase or decrease the revolutions of the engine one revolution. The revolution of the disk 50 is instantly transmitted to the shaft 12 of the revolution indicator and the worm gear therein properly shifted. The officer then releases the lever 20 and the disk is locked by the pin 56 having been forced into position by the spring 61. While this change is being effected by the commanding officer on the bridge, the engineer on watch is instantly apprised thereof by the hand 30 on the dial 31, and the change in the position of the worm shaft 5 to its proper disk 3 with which it must engage to effect the change in the revolution of the engine required by the commanding officer. The dial 31 is placed near the throttle valve so that the engineer on watch can readily see and read the dial and manipulate the throttle valve to supply more or reduce the supply of steam as may be necessary to produce the number of revolutions of the engine required.

It is obvious that the number of disks 3 may be increased or decreased according to the speed of the engine. In maneuvering battleships the speed never exceeds ninety four revolutions or is less than sixty revolutions, while the speed of a cruiser could be from sixty to one hundred and twenty revolutions, or even less than sixty revolutions per minute. It is also obvious that the revolution indicator could be manipulated from the engine room by hand in the event that the apparatus on the bridge should get out of order.

Having thus fully described my invention, what I claim is,

1. In apparatus of the character described, a shaft, a plurality of disks graduated in diameter and secured to said shaft, a revoluble propelling member adapted to engage said disks separately a revoluble shaft parallel with the shaft supporting the disks, supporting and provided with means for revolving said member and on which said shaft member is axially and longitudinally movable, means for raising and lowering said member and means for moving the member from one disk to another.

2. In apparatus of the character described, a shaft, a plurality of disks graduated in diameter and having gear teeth on the periphery thereof and secured to said shaft, a revoluble propelling member provided with a worm gear and adapted to engage said disks separately, a revoluble shaft parallel with the shaft supporting said disks and on which the propelling member is axially and longitudinally movable and a separate shaft provided with means for driving said shaft, means for raising and lowering said member, and means for moving the member from one disk to another.

3. In apparatus of the character described, a shaft, a plurality of disks graduated in diameter and secured to said shaft, a propelling member adapted to engage said disks separately, a revoluble shaft supporting said member at one end, a rack engaging the member at the opposite end, a threaded shaft, and a nut thereon, means connecting said nut and said member for moving the member from one disk to another.

4. In apparatus of the character described, a shaft, a plurality of disks graduated in diameter and secured to said shaft, a revoluble propelling member adapted to engage said disks separately, a revoluble shaft parallel with the shaft supporting the disks and on which the propelling member is axially and longitudinally movable, a separate shaft for driving the shaft supporting said propelling member, means for moving the propelling member, and an indicator connected to and operated by the disk supporting shaft.

5. In apparatus of the character described, a shaft, a plurality of disks graduated in diameter and secured to said shaft, a revoluble shaft, a bifurcated yoke on the latter shaft, a gear wheel on the shaft between the arms of said yoke, a propelling member revolubly supported at one end in said yoke, and provided with a gear wheel engaging the gear wheel on said latter shaft, a threaded shaft having a nut thereon engaging the arms of said yoke for moving the propelling member from one disk to another, and means for revolving the threaded shaft.

6. In apparatus of the character described, a casing, a shaft supported in the ends of the casing, a plurality of disks graduated in diameter and secured to said shaft, a revoluble shaft, a yoke axially and longitudinally movable on the latter shaft, a gear wheel on said latter shaft, a propelling member revolubly supported at one end in said yoke and provided with a gear wheel engaging the gear on the latter shaft, a threaded shaft parallel with the above mentioned shafts, a nut thereon engaging the arms of said yoke, means for raising the propelling member out of engagement with said disks, means for drawing said member into engagement with the disks, and means for revolving the threaded shaft.

7. In apparatus of the character described, a casing, a shaft supported in the ends of the casing, a plurality of disks graduated in diameter and secured to said shaft, a revoluble shaft, a yoke axially and longitudinally movable on the latter shaft, a gear wheel on the latter shaft, a propelling member revolubly supported at one end in said yoke and provided with a gear wheel engaging the gear wheel on the latter shaft, and extending across the casing above said disks and through the wall of the casing, means for locking said member in engagement with any one of the disks, a threaded shaft parallel with the above mentioned shafts, a nut thereon between the arms of said yoke, means for raising the propelling member out of engagement with said disks, means for drawing said member into engagement with the disks, and means for revolving the threaded shaft.

8. In apparatus of the character described, a casing, a shaft supported in said casing, a plurality of disks graduated in diameter and secured to said shaft, a revoluble shaft, a yoke axially and longitudinally movable on the latter shaft, a gear wheel on the latter shaft, a propelling member revolubly supported at one end in said yoke and provided with a gear wheel engaging the gear wheel on the latter shaft, and extending across the casing above said disks, a vertically movable bar having a slot therein through which the propelling member extends, a shaft for raising said bar and the propelling member, means for returning the bar and the propelling member into engagement with either of said disks, means for locking the member in engagement with the disks, and means for moving the propelling member from one disk to another.

9. In apparatus of the character described, a shaft, a plurality of disks graduated in diameter and secured to said shaft, a revoluble propelling member adapted to engage said disks separately, a revoluble shaft supporting said propelling member and on which said member is movable, a threaded shaft parallel with the above mentioned shafts, a nut on the shaft to engage and move the propelling member from one disk to another, a gear wheel on said shaft, a gear wheel and a recording wheel on the shaft supporting the disks, a shaft provided with gear wheels at both ends connecting the disk supporting shaft and the threaded shaft, a hammer engaging the recording wheel and a vertically movable bar engaging the propelling member and adapted to operate said hammer.

10. In apparatus of the character described, a shaft, a plurality of disks graduated in diameter and secured to said shaft, a revoluble propelling member extending across and adapted to engage said disks separately, a screw threaded shaft having a nut thereon engaging the propelling member to move it from one disk to another, a slotted bar engaging the propelling member, a shaft connected to said screw threaded shaft, a revoluble disk for operating the latter shaft, and means for raising the slotted bar to disengage the propelling member from the disks.

11. In apparatus of the character described, a horizontal shaft, a plurality of disks graduated in diameter on said shaft, a longitudinally movable propelling member adapted to engage said disks separately, a screw-threaded shaft, a nut on the shaft engaging the propelling member, and means for revolving said shaft and moving the propelling member from one disk to another.

In testimony whereof I affix my signature, in presence of two witnesses.

EMMANUEL AMODEO-SALVATOR.

Witnesses:
W. PARKER REINOHL,
BOLITHA J. LAWS.